United States Patent [19]

Koerner et al.

[11] Patent Number: 4,842,448

[45] Date of Patent: Jun. 27, 1989

[54] METHOD OF REMOVING CONTAMINANTS FROM CONTAMINATED SOIL IN SITU

[75] Inventors: Robert M. Koerner; Arthur E. Lord, Jr., both of Springfield, Pa.; John E. Brugger, Hightstown, N.J.

[73] Assignee: Drexel University, Philadelphia, Pa.

[21] Appl. No.: 119,504

[22] Filed: Nov. 12, 1987

[51] Int. Cl.$^4$ ................................................ E02D 3/00
[52] U.S. Cl. .................................... 405/258; 405/128; 405/131
[58] Field of Search ............... 405/128, 129, 131, 258; 166/272, 303; 175/11; 210/747; 299/14

[56] References Cited

U.S. PATENT DOCUMENTS

| | | |
|---|---|---|
| 3,291,215 | 12/1966 | Nichols . |
| 3,386,508 | 3/1968 | Bielstein et al. . |
| 3,425,555 | 2/1969 | Ridgeway . |
| 4,257,650 | 3/1981 | Allen . |
| 4,376,598 | 3/1983 | Brouns et al. ................ 405/258 |
| 4,582,611 | 4/1986 | Wang . |
| 4,600,508 | 7/1986 | DeGhetto . |
| 4,611,950 | 9/1986 | Russomano . |
| 4,646,836 | 3/1987 | Goodhart . |

Primary Examiner—David H. Corbin
Attorney, Agent, or Firm—Panitch Schwarze Jacobs and Nadel

[57] ABSTRACT

A method of removing contaminants from a contaminated soil area in situ comprises the steps of placing a barrier in engagement with the exposed surface of the contaminated soil area, sealing the barrier around the periphery of the contaminated soil area and reducing the pressure beneath the outer layer of the barrier to draw the contaminants out of the soil. The barrier is comprised of an outer fluid impermeable layer and an inner fluid permeable layer. The edges of at least the outer layer of the barrier are sealed by digging a trench in the uncontaminated soil beyond the periphery of the contaminated soil area, inserting the edges of the barrier into the trench, refilling the trench and compacting the fill against the ends of the barrier. A liberating fluid may be injected into the soil beneath the contaminated soil area through a plurality of conduits inserted into the soil at acute angles.

11 Claims, 1 Drawing Sheet

METHOD OF REMOVING CONTAMINANTS FROM CONTAMINATED SOIL IN SITU

BACKGROUND OF THE INVENTION

The present invention relates generally to a method of removing contaminants from contaminated soil in situ and, more particularly, to such a method that employs a fluid impermeable barrier on the surface of the contaminated soil and a vacuum for drawing out the contaminants.

Increased environmental awareness has prompted concern over harmful and often irreparable contamination of natural resources. Contamination of soils and the underlying water table have posed particularly acute problems in recent years. Many sites are contaminated by accidental spills and dumping of hazardous liquids, such as organic solvents and hydrocarbons, which become absorbed by the soil and reside temporarily or permanently in the soil's interstices.

Contaminated soils such as these are generally useless to support vegetative and animal life, and often pose a threat to the surrounding ecosystems. In addition, an even more dangerous and pervasive threat exists in the possibility that such contaminants may flow hydrodynamically downward through the soil to the water table, rendering the immediate water unusable and spreading rapidly to contaminate surrounding water resources.

In the past, labor and capital intensive and time consuming excavation, decontamination and recovery procedures were employed to clean the soil and remediate the site. Such procedures often required digging shafts and underground conduits and flooding the contaminated area with suitable solvents. In addition, such excavation and flooding generally required drilling a bore so that the solvents and contaminants could run off into a reservoir for subsequent removal. Moreover, canopies and extensive exhaust systems were required to minimize atmospheric pollution or to remove contaminatd vapor flowing out of the contaminated soil as a result of the decontamination process. Moreover, while such procedures functioned reasonably well, they were not equally applicable to contamination in soils of different density, moisture contents and transmissivity.

The present invention overcomes many of the disadvantages inherent in the methods of decontamination described above by providing a method of drawing out contaminants from the soil while minimizing atmospheric leakage and hydrodynamic downward flow. In addition, the present invention may be employed in conjunction with soil areas of greatly varying density, moisture content and transmissivity. The methods of the present invention are greatly simplified over the prior art and, therefore, may be applied to contaminated soil areas quickly, easily and efficiently, with the result of considerable cost and time savings.

SUMMARY OF THE INVENTION

Briefly stated, the present invention is a method of removing contaminants from a contaminated soil area in situ. The method comprises placing a barrier in engagement with the exposed surface of the contaminated soil area. The barrier is comprised of an outer fluid impermeable layer and an inner fluid permeable layer. The barrier is sealed around the periphery of the contaminated soil area and the pressure beneath the outer layer of the barrier is reduced to draw the contaminants out of the soil. The invention, in one embodiment, further comprises inserting a plurality of conduit means into the soil at acute angles, at least a portion of each conduit means extending beneath at least a portion of the contaminated soil area. One end of each conduit means extends upwardly beyond the soil surface and is secured to a source of liberating fluid. Each conduit means includes a plurality of outlets for injecting the liberating fluid into the soil beneath the contaminated soil area. The liberating fluid is then passed through the conduits to liberate the contaminants from the contaminated soil area.

BRIEF DESCRIPTION OF THE DRAWING

The foregoing summary, as well as the following detailed description of preferred embodiments, will be better understood when read in conjunction with the appended drawing. For the purpose of illustrating the invention, there is shown in the drawing embodiments which are presently preferred, it being understood, however, that the invention is not limited to the specific methods and instrumentalities disclosed. In the drawing.

DESCRIPTION OF PREFERRED EMBODIMENTS

Figure 1:
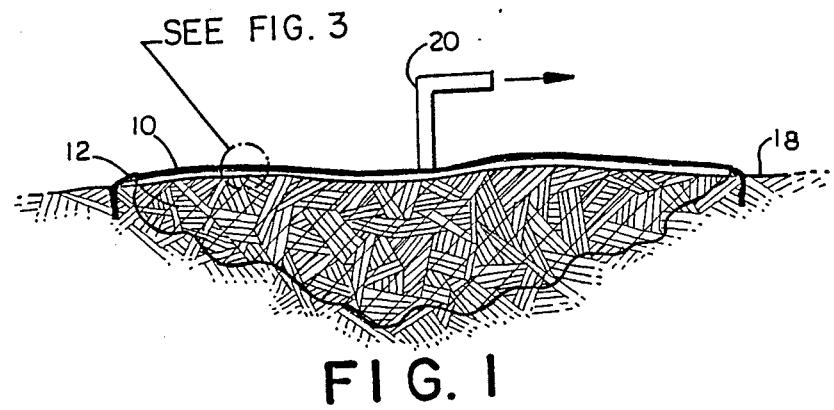
FIG. 1 is a sectional view of a contaminated soil area showing a first embodiment of the present invention.

Referring to the drawing, wherein like numerals indicate like elements throughout, there is shown in Fig. 1 a sectional view through a portion of ground showing a contaminated soil area 12. The contaminated soil area 12 may have been created by spilling, dumping or otherwise releasing a contaminant or contaminating substance, such as a contaminating fluid, on the exposed surface of the soil. Upon release, such a contaminating fluid generally permeates the underlying soil, moving downward and/or radially outward to create a contaminated soil area 12, which may generally be bowl-shaped or arc-like in cross section, as shown in FIG. 1. The degree to which the contaminating fluid permeates the soil and spreads downward and/or radially outward from the site of release varies depending upon the permeability and moisture content of the soil, the viscosity of the contaminating fluid, the air and soil temperature and other factors. However, it should be clearly understood that the methods of the present invention are equally applicable to any size contaminated soil area 12 and to any type of contaminated soil.

Figure 3:
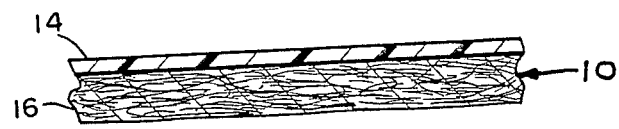
FIG. 3 is a greatly enlarged sectional view of a portion of the barrier of FIG. 1.

The present invention comprises a method of removing contaminants from a contaminated soil area 12 in situ. A barrier or geocomposite 10 is placed in engagement with the exposed surface 18 of the contaminated soil area 12. The barrier or geocomposite 10 is comprised of at least two layers, as shown in FIG. 3. The outer layer 14 of the geocomposite 10 is impermeable to fluids and may be comprised of a polymer material, such as polyethylene. Such fluid impermeable materials are produced commercially in many forms and thicknesses by many companies, such as the National Seal Company, the Phillips Fibers Corp., Gundle Lining Systems, Inc., and J. P. Stevens Co., Inc. In the presently preferred embodiment, the thickness of the outer layer 14 is about 80 mil. However, the thickness of the fluid impermeable outer layer 14 may vary and is determined based upon the ease of handling desired, the soil surface to be covered, the strength of a vacuum pressure to be exerted beneath the fluid impermeable layer 14, as will be hereinafter described, and other factors, which will hereinafter become apparent.

The inner layer 16 of the geocomposite 10 is highly permeable to the contaminants to be withdrawn from the contaminated soil area 12. Preferably, the inner fluid permeable layer 16 is comprised of a mesh material, such as fabric, netting, screening or webbing. Such materials are commercially available from many sources, including the Phlips Fibers Corp., Polyfelt, Inc., the Tensar Corp. and ATP Corp. The type of material and the size openings of the mesh depends upon the transmissivity of the soil present in the contaminated soil area 12. Generally, the inner layer 16 is formed of a material having a fine mesh when the soil present in the contaminated soil area 12 is a fine particulate soil, such as silt or clay. Conversely, when the soil in the contaminated soil area 12 is coarse, such as gravel or sand, an inner layer 16 having a coarse mesh is employed. It may be desirable to utilize inner fluid permeable layer 16 materials of different mesh size in tandem and/or overlapping to cover soils of varying characteristics in the contaminated soil area 12. The materials utilized for the fluid permeable inner layer 16 may also vary depending upon the transmissivity of the contaminants in the contaminated soil area 12, the temperature and other weather conditions and other characteristics of the contaminants. For example, to draw out a contaminant of high viscosity from the contaminated soil area 12, it may be preferable to employ a fluid permeable inner layer 16 with a coarser mesh size than if the contaminant to be drawn out were of a lower viscosity. It will be appreciated by those skilled in the art that the present invention is not limited to a particular mesh material or class of such material, but that any material with an appropriately sized mesh may be employed.

The overall thickness of the geocomposite 10 may vary, depending upon variations in the thickness of the outer layer 14 and the inner layer 16. In a preferred embodiment, as shown in Figs. 1 and 3, the overall thickness of the geocomposite 10 is less than one inch. It will be appreciated by those skilled in the art that for certain applications, the thickness of the geocomposite 10 may be greater or less than one inch, and that the present invention is not limited to a barrier or geocomposite 10 of particular thickness.

The geocomposite 10 is placed in engagement with the exposed surface 18 of the contaminated soil area 12 over the entire region to be decontaminated. As previously indicated, the size and shape of the contaminated soil area 12 varies, depending upon the type of soil present, its water content, the type of contaminants and other factors. The overall size and shape of the geocomposite 10 correspondingly varies so that the geocomposite 10 is sized and shaped to cover and extend at least slightly beyond the entire contaminated soil area 12. Typically, the contaminated soil area 12—and thus the geocomposite 10—is generally circular in a top plan view, because fluid contamination of soil areas typically spreads out in a generally regular circular pattern from its point of release. The size and shape of the contaminated soil area 12 may be determined by employing probes (not shown) or other types of test apparatus (not shown) in a manner well known in the art. It will be appreciated by those skilled in the art that the present invention is not limited to a geocomposite of a particular size or shape.

After the geocomposite 10 has been placed on the exposed surface of the contaminated soil area 12, the peripheral edges of the geocomposite 10 are sealed around the periphery of the contaminated soil area 12 as shown in FIG. 1. In the presently preferred embodiment, the peripheral edges of the geocomposite 10 are sealed by digging a trench in the uncontaminated soil surrounding the contaminated soil area 12 and inserting the edges of at least the outer fluid impermeable layer 14 of the geocomposite 10 into the trench. The trench is then refilled and the fill is tightly compacted against the fluid impermeable outer layer 14. It will be recognized by those skilled in the art that the depth of the trench necessary for sealing the geocomposite 10 will vary depending upon the characteristics of the soil and the size of the contaminated soil area 12. Typically, a trench on the order of about one foot to about four feet deep is preferred. The width of the trench varies, depending upon the type of soil and the manner in which the soil may be compacted for sealing the geocomposite 10.

To remove the contaminants from the contaminated soil area 12, the pressure beneath the outer layer 14 of the geocomposite 10 is reduced to draw or pull out the contaminants by a suction force. In the present embodiment, the pressure beneath the outer barrier layer 14 is reduced by a pumping source or vacuum pump (not shown), the negative pressure end of which is attached to one end of a conduit or pipe 20. The other end of the pipe 20 extends beneath the outer fluid impermeable layer 14 to provide fluid communication between the vacuum pump and the area beneath the outer fluid impermeable layer 14. The negative pressure or vacuum applied by the vacuum pump preferably exerts a suction force on the surface of the contaminated soil area 12 of between five and thirteen pounds per square inch. In this manner, contaminants are drawn out of the surface 18 of the soil, which is in engagement with the inner fluid permeable layer 16 of the geocomposite 10. The contaminants pass through the inner fluid permeable layer 16 and are vacuumed off through the pipe 20 to a container (not shown) for processing, storage or transportation. The inner fluid permeable layer 16 permits removal of the contaminants while holding the soil in place.

It will be apparent to those skilled in the art that the time period required for such negative pressure or vacuum applied to the soil in this manner to draw out of the contaminants in the contaminated soil area 12 will vary. Such period of time depends upon the overall size of the contaminated soil area 12, the volume of the contaminants, the transmissivity of the soil, the transmissivity of the contaminant or contaminants and other factors apparent to those skilled in the art. For example, it generally takes less time to draw high transmissivity contaminants from the soil than the time it takes to draw lower transmissivity contaminants from the same soil. Correspondingly, it generally takes less time to draw the same contaminants from high transmissivity soil than from low transmissivity soil. Each application of the present invention must be evaluated on a case-by-case basis to determine when the contaminants have been removed.

The contaminated soil area 12 may be periodically analyzed by using one or more probes (not shown) or other known test apparatus (not shown) to determine the presence or absence of the contaminants in the soil.

Alternatively, if the volume of the contaminant released is known, the volume of the recovered contaminants may be analyzed and compared to the known volume to determine when an acceptable percentage of the contaminant or contaminants have been recovered.

While in many applications the above-described method is adequate for the removal of many contaminants, it will be recognized by those skilled in the art that certain soils, certain environmental and/or ecological circumstances and certain contaminants may require additional means to facilitate contaminant removal. For example, a soil contaminated with high viscosity contaminants in cold weather conditions, which further hinder the transmissivity of the contaminants through the soil, may prove more difficult to decontaminate. In such cases, it may be preferable to facilitate contaminant removal by decreasing the viscosity of the contaminants or by combining the contaminants with a liberating fluid having a higher transmissivity than the contaminants. In addition, exigencies may exist whereby the time for contaminant removal is to be preferably accelerated. In such a case, again, it may be preferable to facilitate contaminant removal by utilizing a liberating fluid.

Figure 2:
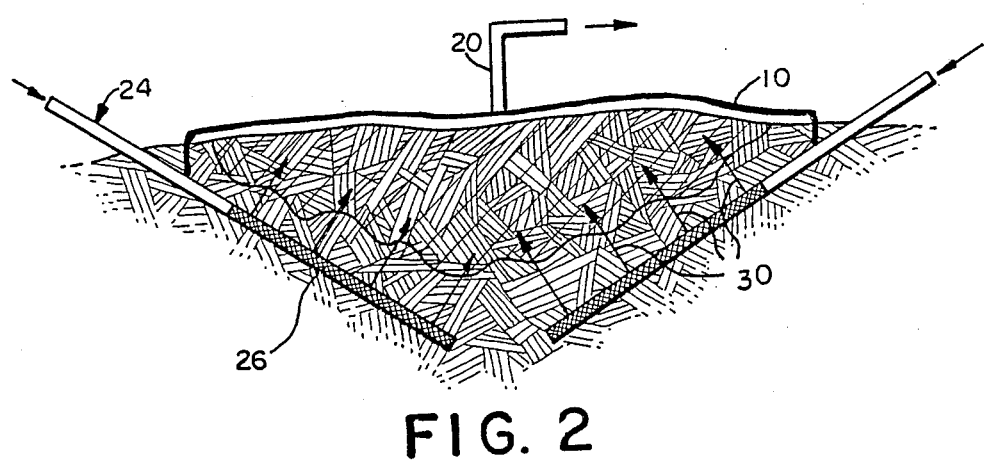
FIG. 2 is a sectional view of a contaiminated soil area showing a second embodiment of the present invention.

The present invention further comprises injecting a liberating fluid beneath the contaminated soil area 12. In the embodiment shown in FIG. 2, a plurality of conduit means or pipes 24 are inserted at spaced locations into the soil, at least a portion of each pipe 24 extending beneath at least a portion of the contaminated soil area 12, so that a liberating fluid may be injected into the soil to help liberate the contaminants from the soil. In this manner, stubborn contaminants, such as contaminants that may adhere to the soil substrate, and other types of contaminants may react, dissolve, or may become otherwise released from the soil and drawn out by the vacuum as described above.

In the present embodiment, it is preferred that the pipes 24 each have a plurality of outlets 26 along at least the portion of the pipes 24 extending beneath the contaminated soil area 12, and be inserted directly beneath the contaminated soil area 12 at acute angles with respect to the surface of the soil.

One end of each pipe 24 extends upwardly beyond the exposed surface of the soil 18 in the present embodiment preferably beyond the periphery of the contaminated soil area 12 and beyond the sealed edges of the geocomposite 10. The ends of the pipes 24, which extend above the surface of the soil, are secured to a source of liberating fluid (not shown). The liberating fluid source provides liberating fluid under pressure, which passes through the pipes 24 and out of the outlets 26. The outlets 26 beneath the contaminated soil area 12 are positioned so that liberating fluid passing therethrough flows in an upward direction as indicated by arrows 30. The vacuum assists in drawing the liberating fluid upward through the contaminated soil area 12.

The depth to which the pipes 24 are inserted depends upon the permeability and water content of the soil in the contaminated soil area and, hence, the depth of the contaminated soil area 12. Clay, for example, is not highly permeable and the pipes 24 may be inserted to a depth of about one to five feet. Gravel, on the other hand, is highly permeable and the pipes 24 may be inserted to considerably greater depths. One skilled in the art can determine the appropriate insertion depth in view of the depth of the contamination within the contaminated soil area 12.

In the present embodiment, it is preferred that the liberating fluid pumped through the pipes 24 for injection into the soil beneath the contaminated soil area 12 is heated air or steam. However, any other fluid suitable for liberating contaminants from the soil could be employed either alone or in combination with the heated air or steam.

It is presently preferred that the method of placing a geocomposite 10 in engagement with the exposed surface 18 of the contaminated soil area 12 sealing the geocomposite 10 around the periphery of the contaminated soil area 12 and reducing the pressure beneath the outer layer 16 of the geocomposite 10 to draw the contaminants out of the soil is the first step of soil decontamination. If this method is not effective in removing a particular contaminant from the soil or is not fast enough, the second step comprises installing the pipes 24 and injecting heated air through the pipes 24 and out through the outlets 26 into the soil beneath the contaminated soil area 12 to liberate the contaminants therein. If the injection of the heated air is not effective or fast enough in liberating a particular contaminant from the soil, the next step comprises injecting steam through the pipes 24 and out through the outlets 26 into the soil beneath the contaminated soil area 12 to liberate the contaminants therein. However, as will be appreciated by those skilled in the art, the liberating fluid could be of any other composition suitable for facilitating removal of contaminants from the soil.

Furthermore, the liberating fluids injected into the soil may be varied or may be alternated depending upon the characteristics of the soil and the characteristics of the contaminants. The amount of liberating fluid injected into the soil may also vary depending upon the characteristics of the soil and/or the characteristics of the contaminants.

From the foregoing description, it can be seen that the present invention comprises a method of removing contaminants from a contaminated soil area in situ. It will be appreciated by those skilled in the art that the present invention may be embodied in other specific forms without departing from the spirit or the central attributes thereof and, accordingly, reference should be made to the appended claims, rather than to the foregoing specification as indicating the scope of the invention.

We claim:

1. A method of removing contaminants from a contaminated soil area in situ, which comprises:
    placing a barrier in engagement with the exposed surface of the contaminated soil area, the barrier comprising an outer fluid impermeable and an inner fluid permeable layer, substantially the entire inner fluid permeable layer engaging the surface of the contaminated soil area; and
    sealing the barrier around the periphery of the contaminated soil area; and
    reducing the pressure beneath the outer layer of the barrier to draw the contaminants out of the soil and through the inner fluid permeable layer.

2. The method as recited in claim 1, wherein sealing the barrier comprises digging a trench around the periphery of the contaminated soil area, inserting the edges of at least the outer layer of the barrier into the trench, refilling the trench and compacting the fill against the ends of the barrier.

3. The method as recited in claim 1 wherein the pressure beneath the outer layer of the barrier is reduced by pumping means exerting a negative pressure of at least five pounds per square inch.

4. The method as recited in claim 1, wherin the outer layer of the barrier is comprised of a polymer material.

5. The method as recited in claim 1, wherein the inner layer is comprised of a meshed material.

6. The method as recited in claim 5, wherein the mesh size is determined by the transmissivity of the soil.

7. The method as recited in claim 1, which further comprises:

inserting a plurality of conduit means into the soil at acute angles, at least a portion of each conduit means extending beneath at least a portion of the contaminated soil area;

one end of each conduit means extending upwardly beyond the soil surface and being secured to a source of liberating fluid;

each conduit means including a plurality of outlets for injecting liberating fluid into the soil beneath the contaminated soil area; and passing liberating fluid through said plurality of conduits for liberating the contaminants from the contaminated soil area.

8. The method as recited in claim 7 wherein the liberating fluid is heated air.

9. The method as recited in claim 7, wherein the liberating fluid is steam.

10. The method as recited in claim 7 wherein the one end of each conduit means extends generally beyond the periphery of the contaminated soil area.

11. The method as recited in claim 1 which further comprises injecting liberating fluid beneath the contaminated soil area.

* * * * *